(12) United States Patent
Grammel, Jr.

(10) Patent No.: US 7,775,048 B2
(45) Date of Patent: Aug. 17, 2010

(54) SEAL ASSEMBLY

(75) Inventor: Leonard Paul Grammel, Jr., Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 463 days.

(21) Appl. No.: 11/479,564

(22) Filed: Jun. 30, 2006

(65) Prior Publication Data
US 2008/0000236 A1   Jan. 3, 2008

(51) Int. Cl.
*F02K 1/00* (2006.01)
(52) U.S. Cl. .................... 60/770; 239/265.39
(58) Field of Classification Search ............ 60/770; 239/265.39, 265.41
See application file for complete search history.

(56) References Cited

U.S. PATENT DOCUMENTS

| | | | | |
|---|---|---|---|---|
| 2,092,877 | A * | 9/1937 | Haupt et al. | 220/222 |
| 4,575,099 | A | 3/1986 | Nash | |
| 5,078,412 | A | 1/1992 | Baumgarth | |
| 5,143,292 | A | 9/1992 | Corsmeier et al. | |
| 5,288,020 | A | 2/1994 | Pirker | |
| 5,417,441 | A | 5/1995 | Hill | |
| 6,387,074 | B1 * | 5/2002 | Horppu et al. | 604/89 |
| 6,588,768 | B1 | 7/2003 | Janich | |
| 2005/0061005 | A1 * | 3/2005 | Lepretre et al. | 60/800 |

FOREIGN PATENT DOCUMENTS

| | | |
|---|---|---|
| EP | 0689010 A2 | 8/1995 |
| EP | 1092899 A2 | 4/2001 |

OTHER PUBLICATIONS

European Search Report, EP 07 11 0886, Sep. 23, 2009, 5 pages.

* cited by examiner

*Primary Examiner*—Michael Cuff
*Assistant Examiner*—Vikansha S Dwivedi
(74) *Attorney, Agent, or Firm*—William Scott Andes; Steven J. Rosen

(57) ABSTRACT

A sprung seal assembly includes a flexible sprung seal having a center section disposed between opposing curved and cantilevered first and second end sections. First and second free edges of the first and second end sections respectively are trapped within a retainer. First and second sliding lugs attached to the first and second free edges respectively are slidably disposed in first and second channels respectively. The first and second free edges are trapped in the retainer by the first and second sliding lugs disposed in the first and second channels between a mounting surface and the retainer attached to the mounting surface. The center section may have a wear strip. The sprung seal assembly may be disposed between a relatively fixed sidewall and a relatively movable flap of a nozzle assembly. The retainer is mounted to the flap and the center section is in sealing engagement with a sealing surface of the sidewall.

48 Claims, 5 Drawing Sheets

SEAL ASSEMBLY

BACKGROUND OF THE INVENTION

1. Field of the Invention

This invention relates to seals between adjacent relatively moveable members and, more particularly, to a sprung seal usable in a gas turbine engine exhaust nozzle.

2. Description of Related Art

Variable area and vectoring exhaust nozzles of aircraft gas turbine engines for aircraft typically employ two dimensional (2D) nozzles having relatively stationary sidewalls movable flaps. The sidewalls and flaps define, at least in part, boundaries of a hot exhaust flowpath in the nozzle and employ seals between them to contain hot pressurized exhaust gases within the exhaust flowpath and prevent them from leaking out of the nozzle. During the nozzle's operation, the flaps are moved, typically rotated about an axis, and the flaps slide relative to the sidewalls. Space between the moveable flaps and the stationary sidewalls provides a leakage path for relatively high pressure gases in the exhaust flowpath. A major concern in the design of such exhaust systems, therefore, is the control of leakage through a space or gap between the two relatively slidable members. Thus, seals are provided to reduce or substantially eliminate leakage between the members or flaps and the sidewalls.

Exemplary types of exhaust seals that have been used in the past are elastic leaf seals and hinge leaf seals. Elastic leaf seals consist of a generally "U", "S", or otherwise shaped member which is fastened on one side to one of the members to be sealed and is in rubbing contact on its other side to the other member. This seal may be spring loaded so that as the two members move apart, it maintains contact therebetween. The seals are designed to be strong enough to withstand the relatively high pressure of the exhaust flow gases and to be flexible enough to expand and contract with variations in the gap. Hinge leaf seals generally include two flat sheets which pivot from a common hinge point. One of the sheets is attached to one of the members to be sealed and the other sheet is in rubbing contact with the other member.

New modern nozzle designs call for sealing between relatively movable members which undergo large relative movement and at least one of the members may have a contoured sealing surface. Thus, it is highly desirable to have an effective seal for sealing between relatively movable members which undergo large relative movement, one of which has a contoured sealing surface.

SUMMARY OF THE INVENTION

A sprung seal assembly includes a flexible sprung seal having a center section disposed between opposing curved cantilevered first and second end sections. First and second free edges of the first and second end sections respectively are trapped within a retainer. An exemplary embodiment of the sprung seal assembly includes first and second sliding lugs attached to the first and second free edges respectively. The first and second sliding lugs are slidably disposed in first and second channels respectively in the retainer. The retainer is attached to a mounting surface thus trapping the first and second free edges within the retainer. The first and second free edges are trapped between the mounting surface and the retainer by the first and second sliding lugs disposed in the first and second channels. The first and second sliding lugs may be cylindrical. The center section may have a wear strip which may be a center plate.

The sprung seal assembly may be disposed between first and second relatively movable members of a sealable assembly. The retainer is mounted to one of the first and second relatively movable members and the center section is in sealing engagement with another of the first and second relatively movable members. The sprung seal assembly may also be disposed between a relatively fixed sidewall and a relatively movable flap of an aircraft gas turbine engine exhaust nozzle assembly. The retainer is mounted to the flap and the center section is in sealing engagement with the sidewall.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
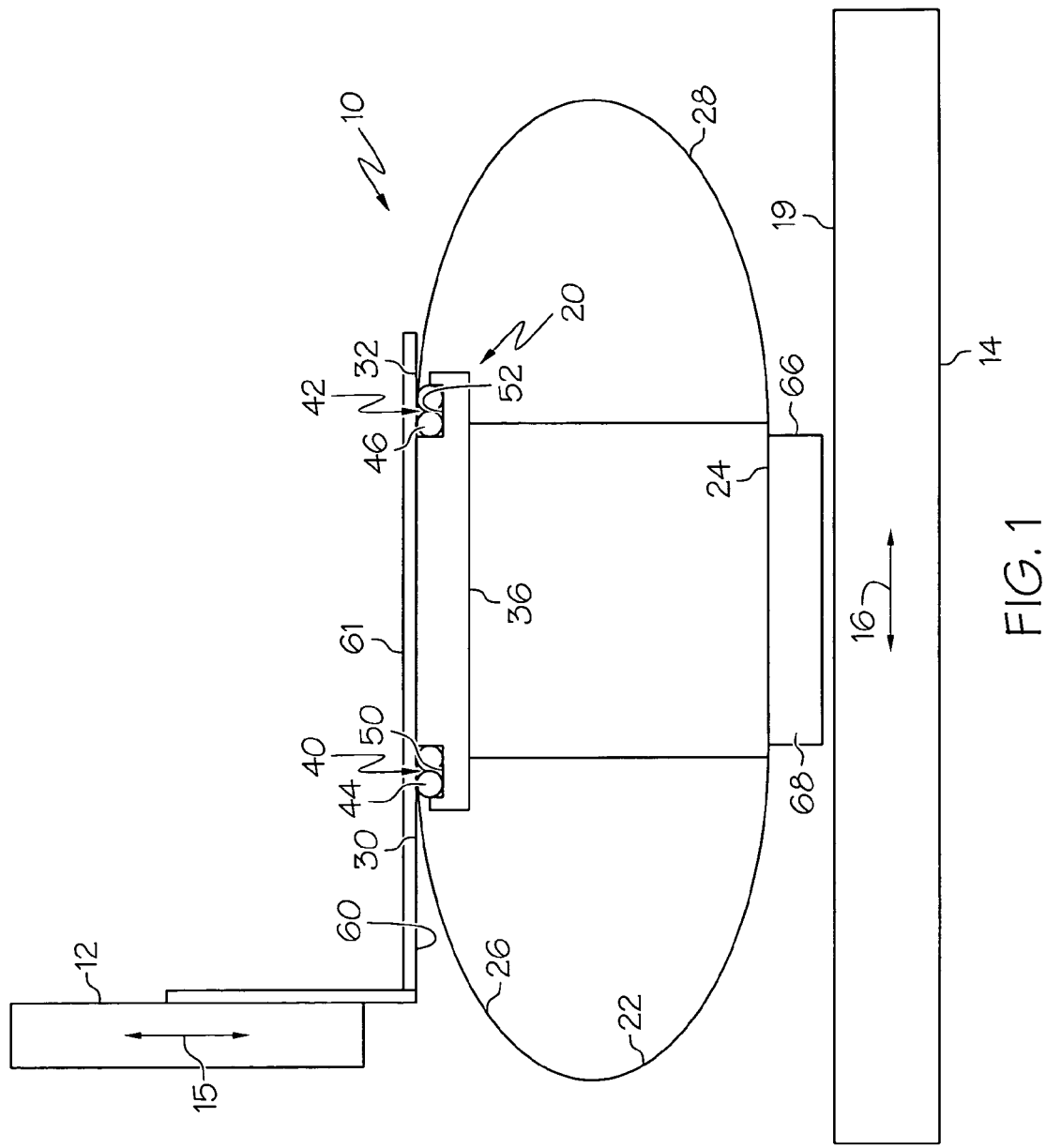
FIG. 1 is a schematical cross-sectional view illustration of a first exemplary embodiment of a sprung seal assembly having a flexible sprung seal a center section disposed between curved opposite cantilevered ends.

Illustrated in FIG. 1 is a sealable assembly 10 including a sprung seal assembly 20 disposed between first and second relatively movable members 12, 14. Such a sealable assembly may be used in the exhaust nozzle of an aircraft gas turbine engine as described below. The first and second members 12, 14 are subject to movement in mutually perpendicular first and second directions 15, 16. The first and second members 12, 14 may both be movable or one may be fixed. As an example the sprung seal assembly 20 may be used in an aircraft engine exhaust nozzle between two movable flaps or a movable sidewall and a movable flap. The sprung seal assembly 20 including a flexible sprung seal 22 having a center section 24 disposed between opposing curved cantilevered first and second end sections 26, 28. The flexible sprung seal 22 is illustrated as made from a strip of a flexible or springy material such as a metal capable of withstanding high temperature as may be found in an aircraft engine exhaust nozzle.

Spaced apart first and second free edges 30, 32 of the first and second end sections 26, 28 respectively are trapped within a retainer 36 by first and second sliding lugs 40, 42 attached to the free edges. The first and second sliding lugs 40, 42 are slidably disposed and trapped in spaced apart first and second channels 50, 52 respectively in the retainer 36. The first and second sliding lugs 40, 42 together with the first and second free edges 30, 32 are trapped between the retainer 36 and a mounting surface 60 which is substantially parallel to the center section 24 and to which the retainer 36 is attached.

The retainer 36 is mounted to one of the first and second relatively movable members 12, 14 along the mounting surface 60 and the center section 24 is in sealing engagement with a sealing surface 19 of another of the first and second relatively movable members 12, 14. The sealing surface 19 is parallel to the mounting surface 60. The retainer 36 in the exemplary embodiment illustrated herein is mounted to the first member 12. The center section 24 in the exemplary embodiment illustrated herein is in sealing engagement with the sealing surface 19 of the second member 14. The center section 24 may have a wear strip 66 illustrated herein as a center plate 68. The mounting surface 60 is illustrated herein as a surface on a mounting bracket 61 attached to the first member 12.

Figure 2:
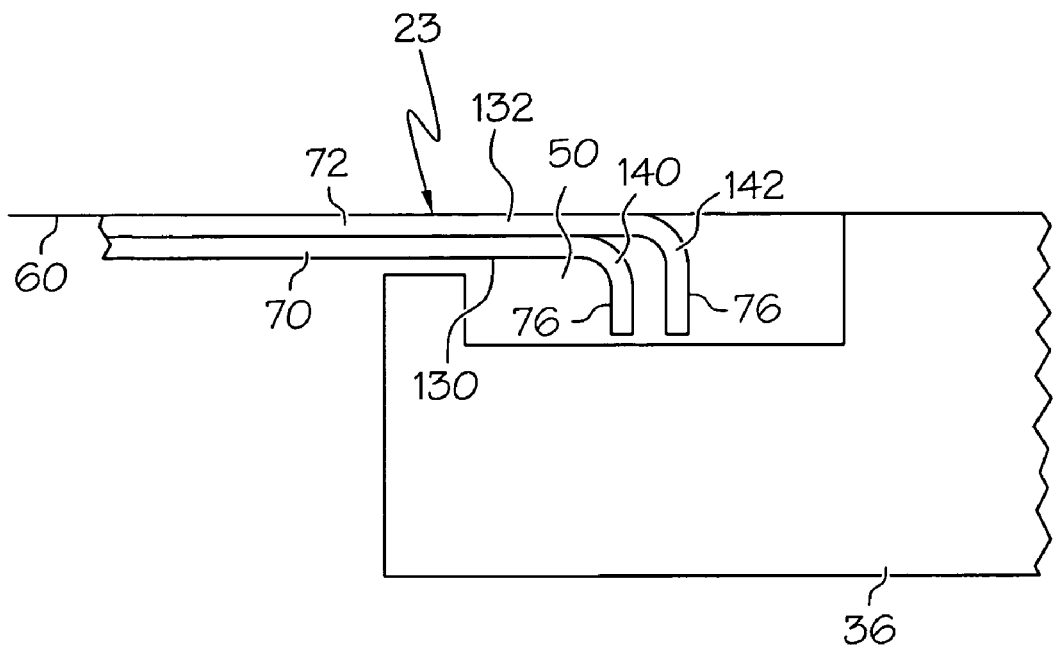
FIG. 2 is a schematical cross-sectional view illustration of a first alternative embodiment of the flexible sprung seal illustrated in FIG. 1 having inner and outer strips with 90 degree bends at first and second free edges.
Figure 3:
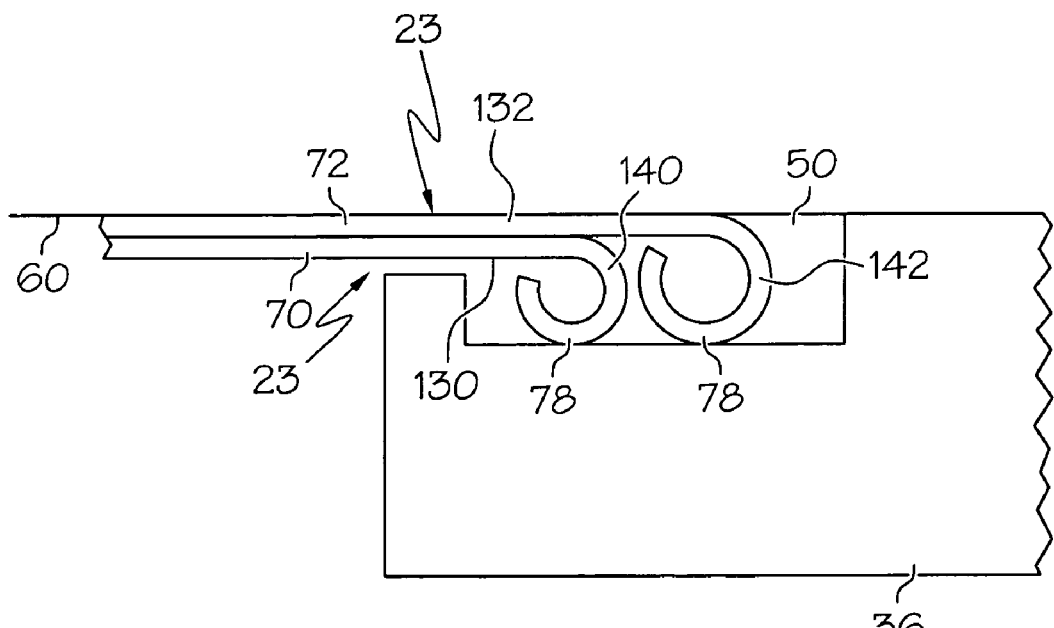
FIG. 3 is a schematical cross-sectional view illustration of a first alternative embodiment of the flexible sprung seal illustrated in FIG. 1 having inner and outer strips with 300 degree bends at first and second free edges.

In FIG. 1, the first and second sliding lugs 40, 42 are illustrated as first and second cylindrical lugs 44, 46 welded or otherwise attached to the first and second free edges 30, 32 of the first and second end sections 26, 28 respectively in FIG. 1. First and second alternative seals in the form of flexible sprung concentric seals 23 are illustrated in FIGS. 2 and 3, respectively. The alternative flexible sprung concentric seals 23 have inner and outer flexible strips 70, 72 made of a flexible material such as a metal capable of withstanding high temperature as may be found in an exhaust nozzle.

The inner and outer flexible strips 70, 72 are shaped like the flexible sprung seal 22 illustrated in FIG. 1. Each of the inner and outer flexible strips 70, 72 has a center sections (not illustrated in FIGS. 2 and 3) disposed between opposing curved cantilevered first and second end sections (not illustrated in FIGS. 2 and 3). Inner and outer free edges 130, 132 of the end sections respectively are trapped within a retainer 36 by inner and outer sliding lugs 140, 142 attached to the inner and outer free edges 130, 132. Each of the inner and outer flexible strips 70, 72 has first and second sets of inner and outer sliding lugs 140, 142 attached to first and second sets of the inner and outer free edges 130, 132 and disposed in the first and second channels 50, 52 respectively in the retainer 36 that is illustrated in FIG. 1. The first and second sliding lugs 40, 42 illustrated in FIG. 2 are about 90 degree bends 76 in the inner and outer free edges 130, 132. The first and second sliding lugs 40, 42 illustrated in FIG. 3 are about 300 degree bends 78 in the inner and outer free edges 130, 132.

Figure 4:
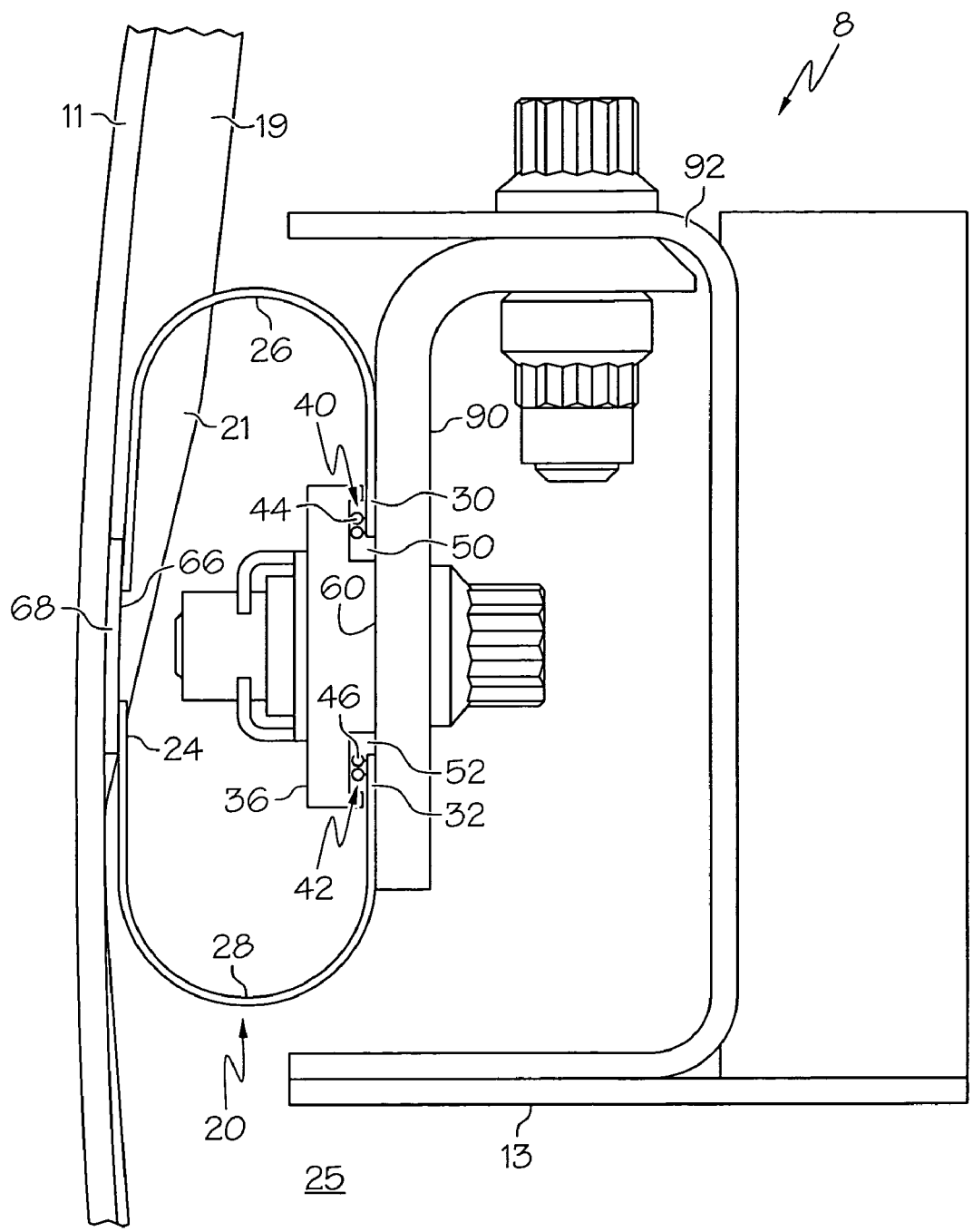
FIG. 4 is partially elevational and partially cross-sectional view illustration of a portion of an aircraft gas turbine engine exhaust nozzle with a sprung seal assembly as illustrated in FIG. 1.
Figure 5:
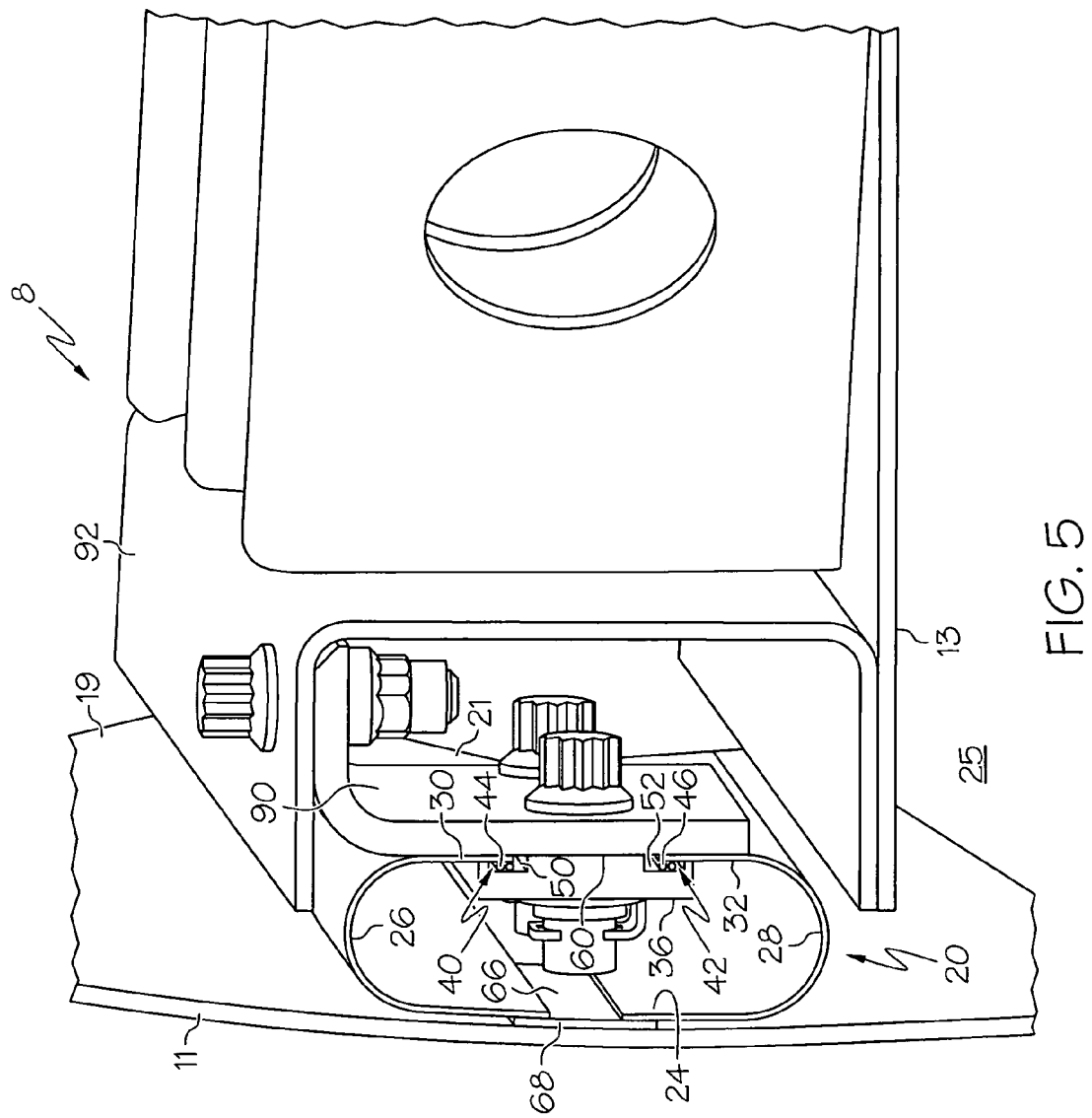
FIG. 5 is a perspective view illustration of the sprung seal assembly illustrated in FIG. 4 looking outwardly towards a sealing surface of an exhaust duct sidewall of the nozzle.
Figure 6:
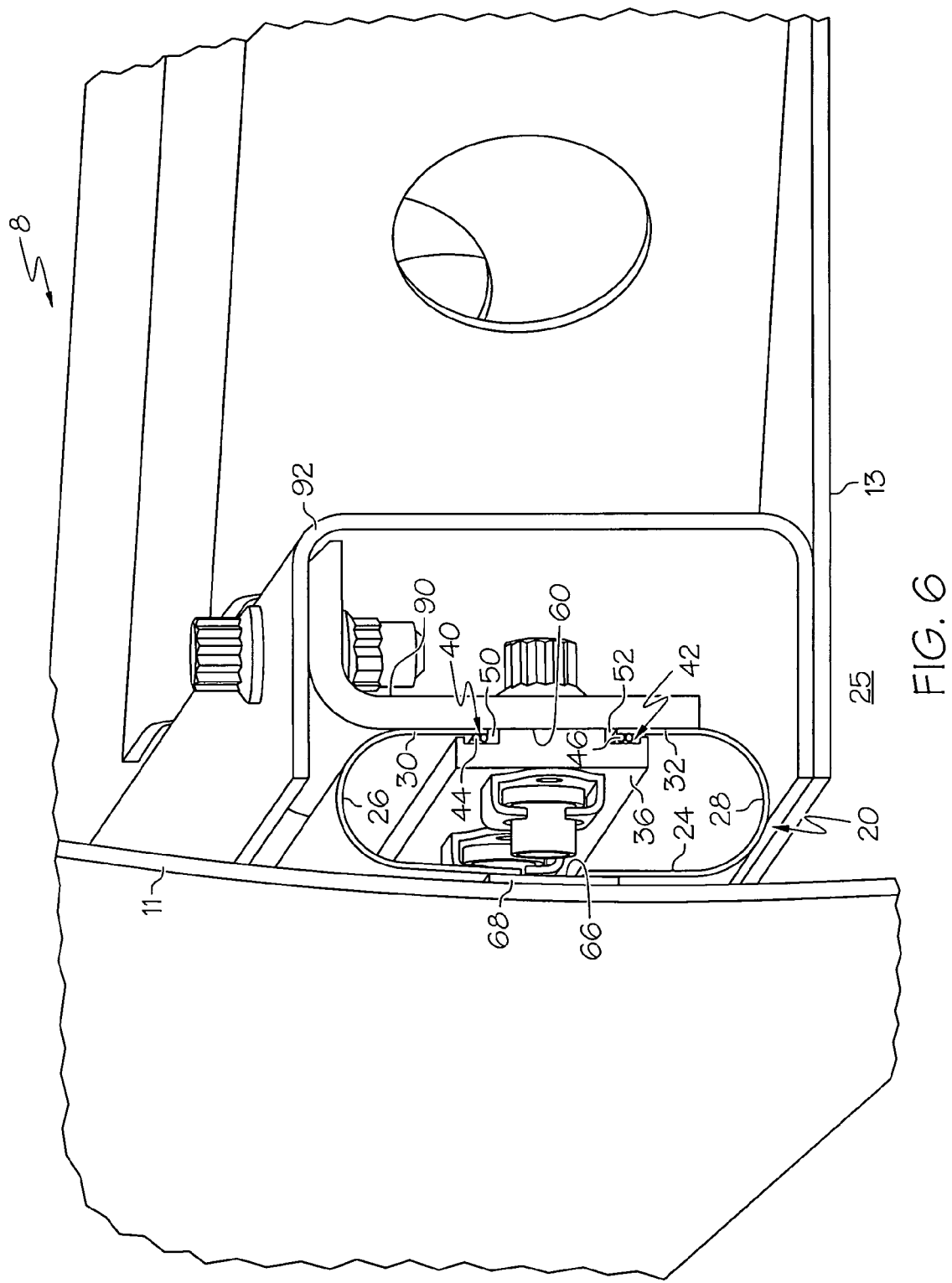
FIG. 6 is a perspective view illustration of the sprung seal assembly illustrated in FIG. 4 looking inwardly through the sealing surface of an exhaust duct sidewall of the nozzle.

Illustrated in FIGS. 4-6 is a portion of an aircraft gas turbine engine exhaust nozzle assembly 8 including a relatively fixed sidewall 11 and a relatively movable flap 13. The fixed sidewall 11 is also illustrative of a fixed liner of a fixed sidewall and the movable flap 13 is also illustrative of a movable liner as may found in an aircraft gas turbine engine exhaust nozzle. The fixed sidewall 11 may be curved or contoured having simple or complex contours 21 or shapes. The fixed sidewall 11 and the movable flap 13 define, at least in part, boundaries of a hot exhaust flowpath 25 in the nozzle exhaust nozzle assembly 8 and employs a sprung seal assembly 20 between them to contain hot pressurized exhaust gases within the exhaust flowpath and prevent them from leaking out of the nozzle assembly. During the nozzle assembly's operation, flaps are moved, typically rotated about an axis, and flaps slide relative to the sidewalls or to other movable flaps. Space between the moveable flaps and the stationary sidewalls provides a leakage path for relatively high pressure gases in the exhaust flowpath which is sealed by the sprung seal assembly 20.

The sprung seal assembly 20 similar to the one illustrated in FIG. 1 is disposed between the sidewall 11 and the flap 13. A flexible sprung seal 22 of sprung seal assembly 20, illustrated in cross-section in FIG. 1, includes a center section 24 disposed between opposing curved cantilevered first and second end sections 26, 28. First and second free edges 30, 32 of the first and second end sections 26, 28 respectively are trapped within a retainer 36. The retainer 36 is mounted to the flap 13 and the center section 24 is in sealing engagement with a sealing surface 19 of the sidewall 11. The flexible sprung seal 22 may be curved or have simple or complex contours 21 or shapes to better match those of and seal against the fixed sidewall 11.

First and second sliding lugs 40, 42 are attached to the first and second free edges 30, 32 respectively. The first and second sliding lugs 40, 42 are slidably disposed in first and second channels 50, 52 respectively in the retainer 36. The retainer 36 is attached to the flap 13 on a mounting surface 60 of the flap 13. The first and second free edges 30, 32 are trapped within the retainer 36 by the first and second sliding lugs 40, 42 disposed in the first and second channels 50, 52 respectively between the retainer 36 and the mounting surface 60. The retainer 36 is mounted on a lengthwise extending L bracket 90 which in turn is mounted on a lengthwise extending C bracket 92 which is attached to the flap 13.

In FIGS. 4-6, the first and second sliding lugs 40, 42 are illustrated as first and second cylindrical lugs 44, 46 welded or otherwise attached to the first and second free edges 30, 32 of the first and second end sections 26, 28 respectively in FIG. 1. The first and second alternative flexible sprung concentric seals 23 having the inner and outer free edges 130, 132 illustrated in FIGS. 2 and 3 respectively may also be used in the embodiment illustrated in FIGS. 4-6. The first and second sliding lugs 40, 42 may be the 90 degree bends 76 or the 300 degree bends 78 in the inner and outer free edges 130, 132.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A sprung seal assembly comprising a flexible sprung seal having a center section disposed between opposing curved cantilevered first and second end sections and spaced apart first and second free edges of the first and second end sections respectively being slidably trapped within spaced apart first and second channels respectively of a retainer.

2. A sprung seal assembly as claimed in claim 1 further comprising first and second sliding lugs attached to the first and second free edges respectively.

3. A sprung seal assembly as claimed in claim 2 further comprising:
   the first and second sliding lugs slidably disposed in the first and second channels respectively in the retainer,
   the retainer attached to a mounting surface substantially parallel to the center section, and
   the first and second free edges trapped within the retainer by the first and second sliding lugs disposed in the first and second channels respectively between the retainer and the mounting surface.

4. A sprung seal assembly as claimed in claim 3 further comprising the center section having a wear strip.

5. A sprung seal assembly as claimed in claim 4 further comprising the wear strip being a center plate.

6. A sprung seal assembly as claimed in claim 3 further comprising the first and second sliding lugs being first and second cylindrical lugs.

7. A sprung seal assembly as claimed in claim 6 further comprising the center section having a wear strip.

8. A sprung seal assembly as claimed in claim 7 further comprising the wear strip being a center plate.

9. A sprung seal assembly as claimed in claim 1 further comprising:
the flexible sprung seal having inner and outer flexible strips,
the inner and outer flexible strips having inner and outer center sections disposed between opposing curved cantilevered inner and outer first and second end sections respectively,
first and second inner and outer free edges of the end sections respectively trapped within spaced apart first and second channels respectively in the retainer, and
first and second inner and outer sliding lugs attached to the first and second inner and outer free edges respectively.

10. A sprung seal assembly as claimed in claim 9 further comprising:
first and second inner and outer sliding lugs slidably disposed in the first and second channels respectively in the retainer,
the retainer attached to a mounting surface substantially parallel to the center section, and
the first and second inner and outer free edges trapped within the retainer by the first and second inner and outer sliding lugs disposed in the first and second channels respectively between the retainer and the mounting surface.

11. A sprung seal assembly as claimed in claim 10 further comprising the first and second inner and outer sliding lugs being about 90 degree bends.

12. A sprung seal assembly as claimed in claim 10 further comprising the first and second inner and outer sliding lugs being about 300 degree bends.

13. A sprung seal assembly as claimed in claim 10 further comprising the first and second inner and outer sliding lugs being bends.

14. A sprung seal assembly as claimed in claim 10 further comprising the first and second inner and outer sliding lugs being cylindrical lugs.

15. A sealable assembly comprising:
a sprung seal assembly disposed between first and second relatively movable members,
the sprung seal assembly including a flexible sprung seal having a center section,
the center section being disposed between opposing curved cantilevered first and second end sections,
spaced apart first and second free edges of the first and second end sections respectively being slidably trapped within spaced apart first and second channels respectively in a retainer, and
the retainer mounted to one of the first and second relatively movable members and the center section in sealing engagement with a sealing surface of another of the first and second relatively movable members.

16. A sealable assembly as claimed in claim 15 further comprising first and second sliding lugs attached to the first and second free edges respectively.

17. A sealable assembly as claimed in claim 16 further comprising:
the first and second sliding lugs being slidably disposed in the first and second channels respectively in the retainer,
the retainer being attached to a mounting surface of the one of the first and second relatively movable members, and
the first and second free edges being slidably trapped within the retainer by the first and second sliding lugs disposed in the first and second channels respectively between the retainer and the mounting surface.

18. A sealable assembly as claimed in claim 17 further comprising the center section having a wear strip.

19. A sealable assembly as claimed in claim 18 further comprising the wear strip being a center plate.

20. A sealable assembly as claimed in claim 17 further comprising the first and second sliding lugs being first and second cylindrical lugs.

21. A sealable assembly as claimed in claim 20 further comprising the center section having a wear strip.

22. A sealable assembly as claimed in claim 21 further comprising the wear strip being a center plate.

23. A sealable assembly as claimed in claim 15 further comprising:
the flexible sprung seal having inner and outer flexible strips,
the inner and outer flexible strips having inner and outer center sections disposed between opposing curved cantilevered inner and outer first and second end sections respectively,
first and second inner and outer free edges of the end sections respectively trapped within the first and second channels respectively in the retainer, and
first and second inner and outer sliding lugs attached to the first and second inner and outer free edges respectively.

24. A sealable assembly as claimed in claim 23 further comprising:
the first and second inner and outer sliding lugs slidably disposed in the first and second channels respectively in the retainer,
the retainer attached to a mounting surface, and
the first and second inner and outer free edges trapped within the retainer by the first and second inner and outer sliding lugs disposed in the first and second channels respectively between the retainer and the mounting surface.

25. A sealable assembly as claimed in claim 24 further comprising the first and second inner and outer sliding lugs being about 90 degree bends.

26. A sealable assembly as claimed in claim 24 further comprising the first and second inner and outer sliding lugs being about 300 degree bends.

27. A sealable assembly as claimed in claim 24 further comprising the first and second inner and outer sliding lugs being bends.

28. A sealable assembly as claimed in claim 24 further comprising the first and second inner and outer sliding lugs being cylindrical lugs.

29. An aircraft gas turbine engine exhaust nozzle assembly comprising:
a sprung seal assembly disposed between a relatively fixed sidewall and a relatively movable flap,
the sprung seal assembly including a flexible sprung seal having a center section,
the center section being disposed between opposing curved cantilevered first and second end sections,
spaced apart first and second free edges of the first and second end sections respectively being slidably trapped within spaced apart first and second channels respectively in a retainer, and the retainer mounted to the flap and the center section in sealing engagement with a sealing surface of the sidewall.

30. A nozzle assembly as claimed in claim 29 further comprising first and second sliding lugs attached to the first and second free edges respectively.

31. A nozzle assembly as claimed in claim 30 further comprising:
the first and second sliding lugs slidably disposed in the first and second channels respectively in the retainer,
the retainer attached to the flap on a mounting surface of the flap, and
the first and second free edges trapped within the retainer by the first and second sliding lugs disposed in the first and second channels respectively between the retainer and the mounting surface.

32. A nozzle assembly as claimed in claim 31 further comprising the first and second sliding lugs being first and second cylindrical lugs.

33. An aircraft gas turbine engine exhaust nozzle assembly as claimed in claim 29 further comprising:
the flexible sprung seal having inner and outer flexible strips,
the inner and outer flexible strips having inner and outer center sections disposed between opposing curved cantilevered inner and outer first and second end sections respectively, and
first and second inner and outer sliding lugs attached to the first and second inner and outer free edges respectively.

34. An aircraft gas turbine engine exhaust nozzle assembly as claimed in claim 33 further comprising:
first and second inner and outer sliding lugs slidably disposed in the first and second channels respectively in the retainer,
the retainer attached to a mounting surface, and
the first and second inner and outer free edges trapped within the retainer by the first and second inner and outer sliding lugs disposed in the first and second channels respectively between the retainer and the mounting surface.

35. An aircraft gas turbine engine exhaust nozzle assembly as claimed in claim 34 further comprising the first and second inner and outer sliding lugs being 90 degree bends.

36. An aircraft gas turbine engine exhaust nozzle assembly as claimed in claim 34 further comprising the first and second inner and outer sliding lugs being 300 degree bends.

37. An aircraft gas turbine engine exhaust nozzle assembly as claimed in claim 34 further comprising the first and second inner and outer sliding lugs being bends.

38. An aircraft gas turbine engine exhaust nozzle assembly as claimed in claim 34 further comprising the first and second inner and outer sliding lugs being cylindrical lugs.

39. An aircraft gas turbine engine exhaust nozzle assembly comprising:
a sprung seal assembly disposed between first and second movable flaps,
the sprung seal assembly including a flexible sprung seal having a center section,
the center section being disposed between opposing curved cantilevered first and second end sections,
spaced apart first and second free edges of the first and second end sections respectively being slidably trapped within spaced apart first and second channels respectively in a retainer, and
the retainer mounted to the first flap and the center section in sealing engagement with a sealing surface of the second flap.

40. A nozzle assembly as claimed in claim 39 further comprising first and second sliding lugs attached to the first and second free edges respectively.

41. A nozzle assembly as claimed in claim 40 further comprising:
the first and second sliding lugs slidably disposed in the first and second channels respectively in the retainer,
the retainer attached to the first flap on a mounting surface of the first flap, and
the first and second free edges trapped within the retainer by the first and second sliding lugs disposed in the first and second channels respectively between the retainer and the mounting surface.

42. A nozzle assembly as claimed in claim 41 further comprising the first and second sliding lugs being first and second cylindrical lugs.

43. An aircraft gas turbine engine exhaust nozzle assembly as claimed in claim 39 further comprising:
the flexible sprung seal having inner and outer flexible strips,
the inner and outer flexible strips having inner and outer center sections disposed between opposing curved cantilevered inner and outer first and second end sections respectively, and
first and second inner and outer sliding lugs attached to the first and second inner and outer free edges respectively.

44. An aircraft gas turbine engine exhaust nozzle assembly as claimed in claim 43 further comprising:
first and second inner and outer sliding lugs slidably disposed in the first and second channels respectively in the retainer,
the retainer attached to a mounting surface, and the first and second inner and outer free edges trapped within the retainer by the first and second inner and outer sliding lugs disposed in the first and second channels respectively between the retainer and the mounting surface.

45. An aircraft gas turbine engine exhaust nozzle assembly as claimed in claim 44 further comprising the first and second inner and outer sliding lugs being about 90 degree bends.

46. An aircraft gas turbine engine exhaust nozzle assembly as claimed in claim 44 further comprising the first and second inner and outer sliding lugs being about 300degree bends.

47. An aircraft gas turbine engine exhaust nozzle assembly as claimed in claim 44 further comprising the first and second inner and outer sliding lugs being bends.

48. An aircraft gas turbine engine exhaust nozzle assembly as claimed in claim 44 further comprising the first and second inner and outer sliding lugs being cylindrical lugs.

* * * * *